(12) United States Patent
Raksi (10) Patent No.: US 8,049,886 B1
(45) Date of Patent: Nov. 1, 2011

(54) SPECTROMETER WITH ADJUSTABLE-DEFLECTOR-CONTROLLED ALIGNMENT FOR OPTICAL COHERENCE TOMOGRAPHY

(75) Inventor: Ferenc Raksi, Mission Viejo, CA (US)

(73) Assignee: Alcon LenSx, Inc., Aliso Viejo, CA (US)

( * ) Notice: Subject to any disclaimer, the term of this patent is extended or adjusted under 35 U.S.C. 154(b) by 0 days.

(21) Appl. No.: 12/904,681

(22) Filed: Oct. 14, 2010

(51) Int. Cl.
*G01J 3/28* (2006.01)
(52) U.S. Cl. .................................................... 356/326
(58) Field of Classification Search .............. 356/326, 356/451
See application file for complete search history.

(56) References Cited

U.S. PATENT DOCUMENTS

| | | |
|---|---|---|
| 5,391,165 A | 2/1995 | Fountain et al. |
| 7,319,566 B2 | 1/2008 | Prince et al. |
| 7,480,058 B2 | 1/2009 | Zhao et al. |
| 7,813,644 B2 | 10/2010 | Chen et al. |
| 7,898,712 B2 | 3/2011 | Adams et al. |
| 2003/0090674 A1* | 5/2003 | Zeylikovich et al. ......... 356/497 |

OTHER PUBLICATIONS

Ostaszewski et al., "Risley Prism Beam Pointer", Proc. of SPIE, 2006, vol. 6304, 630406-1 thru 630406-10 [10 pages].

* cited by examiner

*Primary Examiner* — Tarifur Chowdhury
*Assistant Examiner* — Abdullahi Nur
(74) *Attorney, Agent, or Firm* — Gergely T. Zimanyi (57) ABSTRACT

A spectrometer is presented that can include a spectrally dispersive optical element to spectrally disperse a received light, a leveraged-optics adjustable deflector to adjustably deflect the spectrally dispersed light, and a detector array to receive the spectrally dispersed and adjustably deflected light. The received light can include an interference beam combined from a returned image beam and a reference beam in a Spectral Domain Optical Coherence Tomograph. The detector array can include a linear sensor array. The leveraged-optics adjustable deflector can include an optical element with an adjustable transmissive property or an adjustable reflective property, wherein the adjustable deflector is adjustable by a mechanical adjustment being optically leveraged into a smaller optical adjustment.

17 Claims, 8 Drawing Sheets

SPECTROMETER WITH ADJUSTABLE-DEFLECTOR-CONTROLLED ALIGNMENT FOR OPTICAL COHERENCE TOMOGRAPHY

TECHNICAL FIELD

This patent document describes spectrometers with adjustable deflectors. In more detail, this patent document discusses spectrometers whose alignment is controlled by an adjustable deflector for potential application in optical coherence tomography.

BACKGROUND

Spectral domain optical coherence tomographs (SD-OCTs) image target regions by splitting the light of a relatively broad-band light source into a reference light and an image light, and interfering a returned image light from the target with a returned reference light from e.g. a reference mirror. This interfering or image light is then spectrally decomposed and the spectral components are projected or transmitted to sensors of a sensor array in a detector. The SD-OCTs image the target at a range of z-depths essentially simultaneously at a specific xy lateral location by Fourier transforming the spectral components of the interfering light, sensed by the individual sensors. More traditional OCT systems, e.g. of the time domain type, image the range of z-depths by performing a z-scanning, resulting in considerably slower processing speeds. When an SD-OCT is combined with an x, y, linear, or xy scanner, two or three dimensional images of an entire target region or volume can be formed with remarkably high speed and resolution.

However, the high performance speed and high resolution imaging of the SD-OCTs is typically achieved by a highly precise control over most parameters of their specifications, including the bandwidth of the light source, the resolution and light collection efficiency of the optics and the readout speed of their detector array.

One class of SD-OCTs utilizes high numeric aperture imaging spectrometers with diffraction limited performance to satisfy these requirements. These devices often use a linear array of sensors as the detector, as those can provide faster readout speeds than sensors arranged in two dimensional arrays, and still scan through a target volume with reasonable speed. A typical linear sensor array, suitable for resolving the spectrum of a customary broad-band light source with high precision, may contain over 1,000 or more pixels in a linear arrangement. Presently, a size of individual pixels or sensors falls in the range of 10×10 microns to 20×20 microns. The small size of these individual pixels, however, poses formidable challenges for the alignment of the image beam to realize the potential high resolution of the SD-OCTs.

SUMMARY

The spectrometer of the SD-OCT devices typically receives the image or interfering light from a single-mode optical fiber. The spectrometer spectrally decomposes or disperses this interfering light into its spectral components and transmits the components to individual sensors of its detector. The detected components of the image light are Fourier transformed and analyzed to construct the image of the target.

As described above, detectors with linear sensor arrays have the potential to image efficiently and with high speed. To realize the potential of these linear-array detectors, the spectral decomposing element of the spectrometer projects the decomposed spectrum onto the line of pixels which is 10-20 microns wide. This specification can be achieved by aligning the optical elements of the spectrometer with a sufficiently high accuracy. The specified accuracy of the angular alignment is of the order of milliradians, or mrads, that can be achieved by mechanically adjusting and rotating the optical stages or elements. The accuracy of the lateral alignment, on the other hand, may require an order of magnitude higher precision, as lateral misalignments are magnified by the length of the optical path between the spectral decomposing element and the detector.

To achieve these highly precise alignments, spectrometers may make use of adjustable or movable optical elements which can be fine tuned during assembly to achieve the required precision of the lateral alignment. These adjustable-element spectrometers also offer the possibility of corrective adjustments during their regularly scheduled maintenance. However, adjustable elements can misalign and drift more easily from their optimal alignments once the spectrometer is in operation and thus may often require technical assistance for testing and resetting. In the important case of the spectrometer being used away from a high-technology environment, such as in medical applications, often there may be no immediately available technical assistance to test and reset the alignment of the spectrometer in short or unscheduled time intervals, not to mention the excessive downtime and inconvenience of such a high-maintenance system.

Spectrometer designs that attempt to preempt these challenges by using fixed, non-adjustable stages, on the other hand, face the problem of unacceptably low precision of their lateral alignments as described below in more detail. These clashing requirements pose challenges for optimizing the design of spectrometers.

Various embodiment of spectrometers described in this patent document advantageously provide improved alignment with a sensor array in a manner that can offer solutions for these design challenges. In particular, various embodiments of spectrometers provide adjustable deflection of image and other types of light that can improve an alignment with the sensor array.

In some embodiments, a spectrometer can include a spectrally dispersive optical element configured to spectrally disperse a received light, a leveraged-optics adjustable deflector to adjustably deflect the spectrally dispersed light, and a detector array to receive the spectrally dispersed and adjustably deflected light. The received light can include an interference beam combined from a returned image beam and a reference beam.

In some implementations, the spectrally dispersive optical element can include a prism, a grating, an optical element with a wavelength dependent index of refraction, an optical element with a wavelength dependent transmission property or an optical element with a wavelength dependent deflection property. In some implementations, the detector array can include a linear sensor array, a two-dimensional sensor array, or a detector camera.

In some implementations, the leveraged-optics adjustable deflector can include an optical element with an adjustable transmissive property or an adjustable reflective property, wherein the adjustable deflector is adjustable by a mechanical adjustment being optically leveraged into a smaller optical adjustment. In some implementations a ratio of an angle of the mechanical adjustment to an angle of the optical adjustment can exceed 10, in others, 100. In some implementations a ratio of the angle of the mechanical adjustment to the angle of the optical adjustment is more than 5 but less than 100. The adjustable deflector can include at least one rotatable wedged optical plate.

In some implementations the spectrometer is an imaging spectrometer, including a collimator, converting the received light into a parallel light, and a focusing lens, focusing and imaging the spectrally dispersed light onto the detector array.

In some implementations a first detector-beam-position range associated with a deflection-adjustment range of the deflector exceeds a second detector-beam-position range associated with a cumulative position-tolerance range of components of the spectrometer. In some implementations a first detector-beam-position range associated with a deflection-adjustment range of the deflector exceeds an operational detector-beam-position range of the spectrometer. In some implementations an operational beam misalignment caused by the leveraged-optics adjustable deflector is smaller than a misalignment tolerance of the detector. In some implementations the adjustable deflector is configured to compensate a lateral misalignment of the spectrally dispersed light without introducing an angular misalignment larger than an aspect ratio of the detector.

In some implementations the spectrometer is configured to allow compensation of a longitudinal misalignment through recalibration of its sensors using a known-wavelength light.

In some implementations a spectral domain optical coherence tomography (SD-OCT) device can include a spectral decomposer, configured to receive an interfering light, and to create a sheet of interfering light by laterally separating spectral components of the interfering light, a sensor array to detect different spectral components of the sheet of interfering light by different sensors, and a leveraged adjustable alignment-controller to control an alignment of the sheet of light with the sensor array. The alignment-controller can include a rotatable wedged prism.

In some implementations a spectrometer can include a spectral disperser to laterally disperse spectral components of an image light, a sensor array to sense the spectral components of the image light, and an optically leveraged alignment-controller capable of compensating a cumulative beam position misalignment due to the positional variation of elements of the spectrometer.

DETAILED DESCRIPTION

Implementations and embodiments in this patent document offer improvements for the above described competing requirements of high precision alignment and long term stability of spectrometers.

As discussed above, high precision alignment can be reached in spectrometers by mounting adjustable optical elements in alignment stages. However, since these elements are adjustable, even in the course of the regular operation of the spectrometer, these adjustable elements may start drifting away, rotating and deforming from their original position and settings, introducing misalignments. These misalignments are detrimental to the precision of the spectrometer and undermine the long term stability of the spectrometer.

The stability of the spectrometers can be increased by bonding or mechanically clamping the optical elements in fixed mounts. Installing fixed mounts during the assembly of the spectrometer, on the other hand, limits the precision of the alignment of the optical elements. In a representative example, if an optical element is installed into a spectrometer at least in part manually, its position can be controlled with a precision on the scale of hundred microns. As the spectrometer contains several optical elements, the cumulative beam position misalignment or tolerance error can reach several hundred microns, possibly up to 1,000 microns. Since the physical extent of the individual sensors in the detector array is about 10-20 microns, the hundreds of microns of misalignment caused by the errors of the assembly of the bonded optical elements can substantially reduce the efficiency of the spectrometer, possibly even threatening the functionality of to spectrometer itself. Therefore, the high long term stability of bonded spectrometers comes at the price of an increased problem of misalignment arising during the assembly of the spectrometer.

Figure 1:
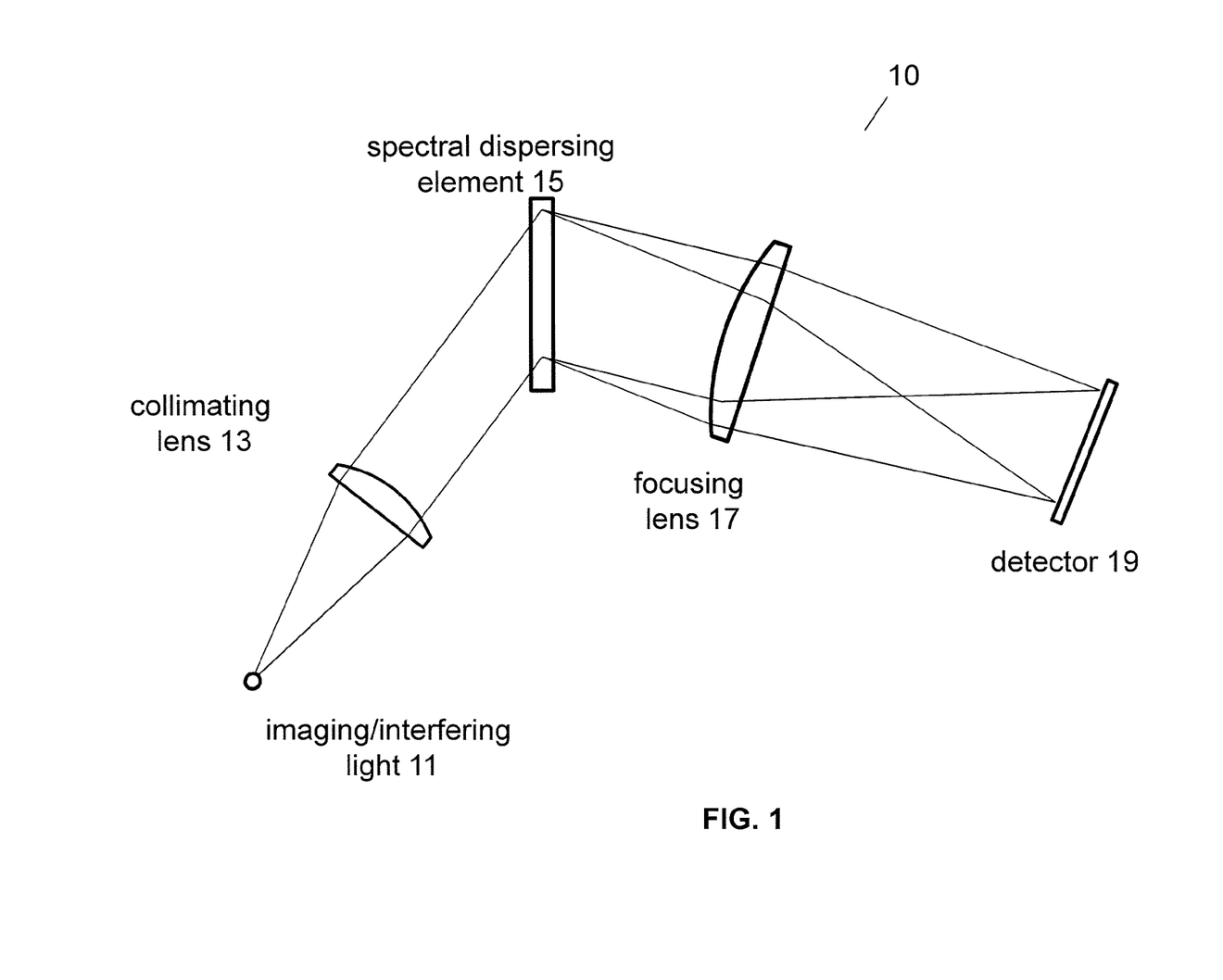
FIG. 1 illustrates the spectrometer.

FIG. 1 illustrates the above problems on the example of a typical spectrometer 10. The spectrometer 10 receives an image or interfering light 11 and can transmit it through a collimator or collimating lens 13 that transforms the received light into parallel rays. The collimated rays can reach a spectrally dispersing element 15 that laterally spreads the spectral components of the rays and redirects them toward a focusing lens 17 which in turn images or focuses them onto a detector 19.

Spectrometers can be classified into imaging and non-imaging categories. An imaging spectrometer typically receives the light from a point-like source and images it to a point on its detector. Such a point-like source can be the tip of an optical fiber. A non-imaging spectrometer typically receives the light in the form of a slit and transfers it as a line to its detector.

As a matter of nomenclature, the term image light above can refer to light received by either an imaging or a non-imaging spectrometer, as the light is named image light to represent that it carries image information about the target of imaging. The here described design principles can be implemented in both imaging and non-imaging spectrometers.

Figures 2A, 2B:
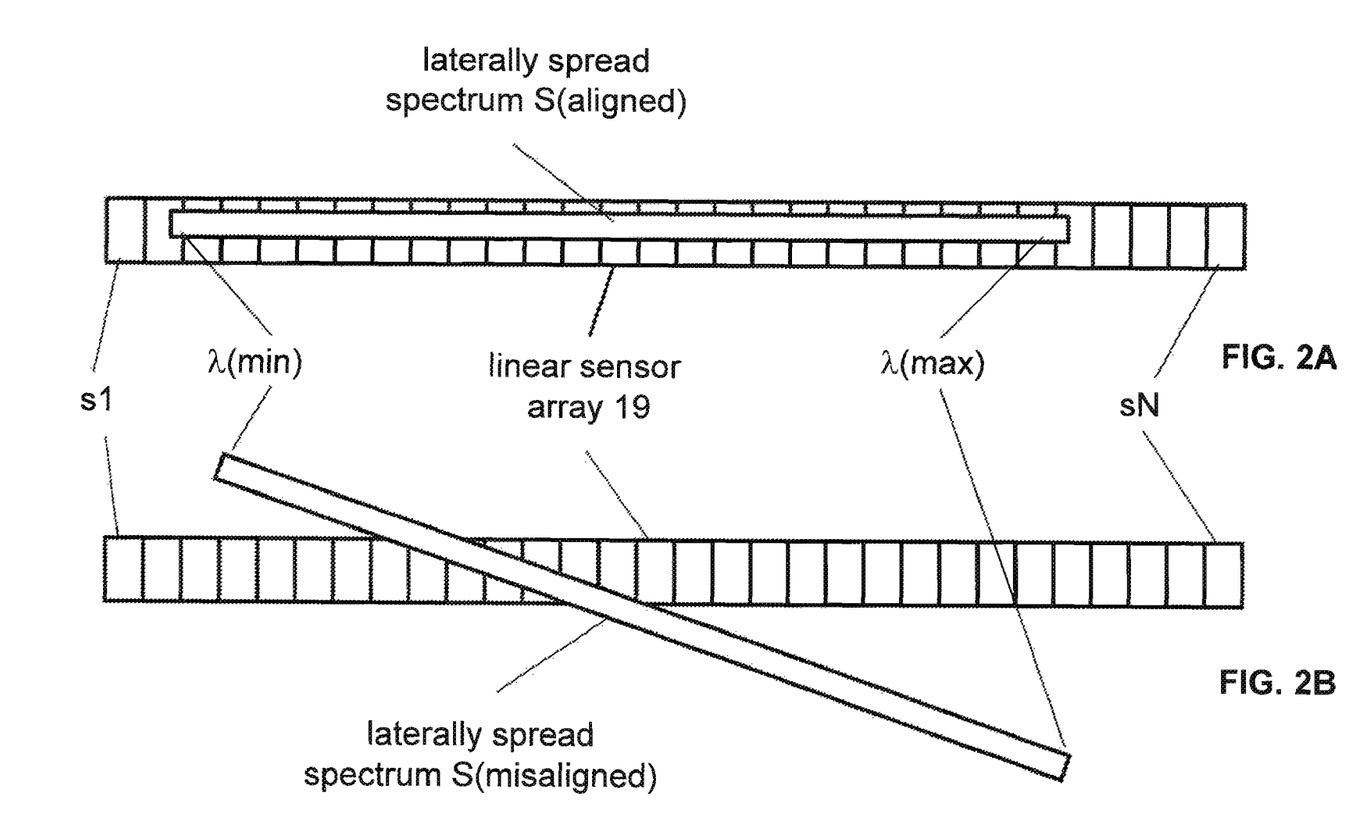
FIG. 2A illustrates an optimally aligned spectrally dispersed light projected on the linear sensor array of the spectrometer.
FIG. 2B illustrates a spectrally dispersed light with angular and lateral misalignments.

FIGS. 2A-B illustrate that the spectrally dispersed rays can form a sheet of light where the spectral components of the light propagate in a laterally spread manner. The laterally spread spectrum contains rays with wavelengths from λ(min) to λ(max), corresponding to the bandwidth of the light source. This sheet of light can be projected onto an array of sensors. In the shown example, the array is a linear sensor array 19 which collects image data for a range of z depth essentially simultaneously at an xy target location and thus offers a good processing and readout speed.

The sheet of light or laterally spread spectrum intersects the plane of the linear sensor array at a line S with a diffraction limited width. FIG. 2A shows a well-aligned spectrometer 10 where the laterally spread spectrum S(aligned) is aligned with the linear sensor array 19. The linear sensor array 19 can include N sensors from s1 to sN. In typical spectrometers, N can be about a 1,000 or more. The spectral components of the light will be resolved into M<N small wavelength intervals, whose width Δλ is determined, among others, by the spatial width of the individual sensors. The above quantities can be related via the approximate relation MΔλ~[λ(max)−λ(min)].

FIG. 2B illustrates a typical misaligned spectrometer, where the laterally spread spectrum intersects the plane of the linear sensor array 19 in a tilted or rotated line S(misaligned). In this misaligned spectrometer a portion of the sensors is able to sense the incident laterally spread spectrum, but a sizeable portion of the spread spectrum misses the linear sensor array entirely.

Some of the leading causes of the misalignment include the limited precision of the assembly process. Often the installation of the optical elements involves manual steps and manipulations. A beam-position-misalignment at the sensor array due to the imprecision or tolerance error of the manual steps of the installation can be of the order of 100 microns. The errors caused by the individual optical elements of the spectrometer can accumulate to a cumulative error of the order of 1,000 microns.

Another potential source of the misalignment is the changing operating conditions of the spectrometer. Temperature changes can cause a drift of the position of the optical elements. Mechanical stresses, shear and twist of the housing of the entire imaging device can also cause relative misplacement or rotation of the optical elements.

Figure 3A:
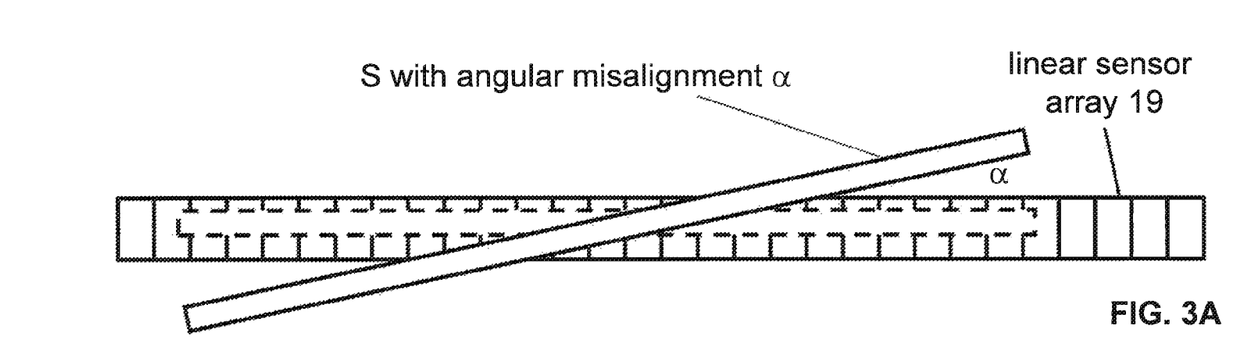
FIGS. 3A-C illustrate three basic types of misalignments.
Figure 3B:
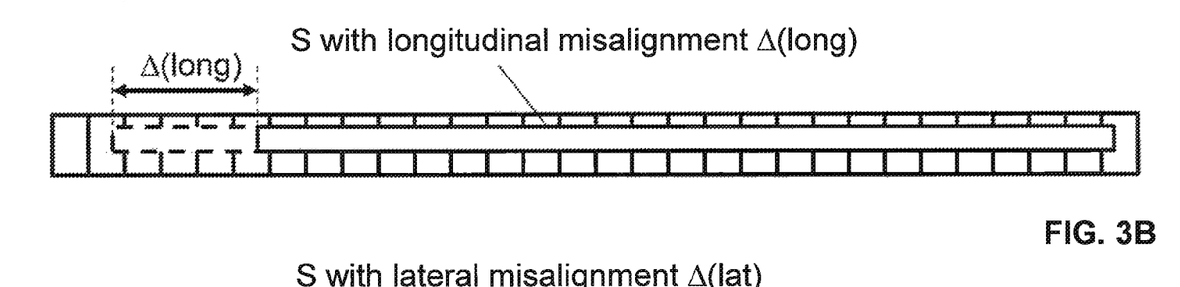
Figure 3C:
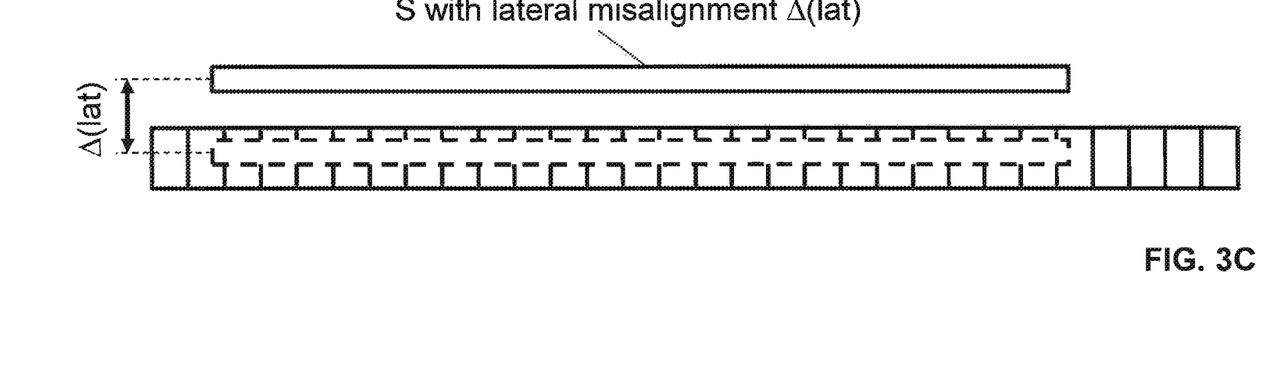

FIGS. 3A-C illustrate that there are at least three types of misalignment. The generic misalignment of FIG. 2B can be typically decomposed into a superposition of these three misalignments.

FIG. 3A illustrates an angular or rotational misalignment, characterized by the misalignment angle α between the spread spectrum S and the line of the linear sensor array.

Such angular misalignments can be minimized or eliminated if the spread spectrum S is aligned with the linear sensor array so that even the outermost wavelengths λ(min) and λ(max) fall on sensors of the array. In a sensor array of about 1,000 individual sensors or pixels, this translates to a being less than about 1/500, or 2 milliradians (mrad). A 1-2 mrad precision of the angular alignment of the optical elements can be achieved even if the spectrometer is manually assembled and manipulated.

FIG. 3B illustrates a longitudinal misalignment, characterized by the spread spectrum S having a good angular alignment with the linear sensor array, but the wavelengths of the spectral components being shifted by a detector-beam-position Δ(long) distance along the linear sensor array 19. Here the term "detector-beam-position" abbreviates the position of the beam at the detector. Such a longitudinal misalignment can be caused e.g. by an optical element having been inadvertently installed into a slightly shifted position. This shift can cause a specific spectrum or wavelength component λ(spec) being directed to a sensor at a Δ(long) distance away along the linear array from the sensor nominally intended to sense this particular wavelength component λ(spec).

Such longitudinal misalignments can also be minimized or eliminated by e.g. the following steps: (a) a light with a well known specific wavelength λ(spec) can be projected onto the spectrometer; (b) an index/label/location of the sensor s(spec-sensing) that reports sensing the well known wavelength λ(spec) can be recorded; (c) the distance Δ(long) between the sensor s(spec-sensing) actually sensing the specific wavelength λ(spec) and the sensor s(spec-design) that was nominally designed to sense this λ(spec) wavelength can be determined; and (d) the correspondence or look-up-table between the labels/locations of the individual sensors s(i) and the wavelength of the spectral components sensed by them can be recalibrated according to this measured Δ(long) along the entire sensor array 19. In some cases spectral lamps or other light sources with known atomic spectra can be used for this purpose, including mercury, sodium or inert gas lamps.

FIG. 3C illustrates a spread spectrum S with a lateral misalignment, where the spread spectrum S, or sheet of light intersects the plane of the linear sensor array 19 at a distance Δ(lat) from the sensor array 19. Since the lateral extent of the linear array can be of the order of 10 microns, and a typical distance separating the spectrally dispersing element 15 and the detector 19 is of the order of 0.1 meter=100,000 microns, the spectrally dispersing element 15 is able to minimize or eliminate the lateral misalignment Δ(lat) if it is aligned with an angular precision of 10 microns/100,000 microns=0.1 mrad.

This 0.1 mrad precision is an order of magnitude tighter than the 1 mrad precision capable of eliminating the angular misalignment as mentioned before. Such 0.1 mrad precision is typically inaccessible for spectrometers whose assembly involves manual manipulations.

Figure 4A:
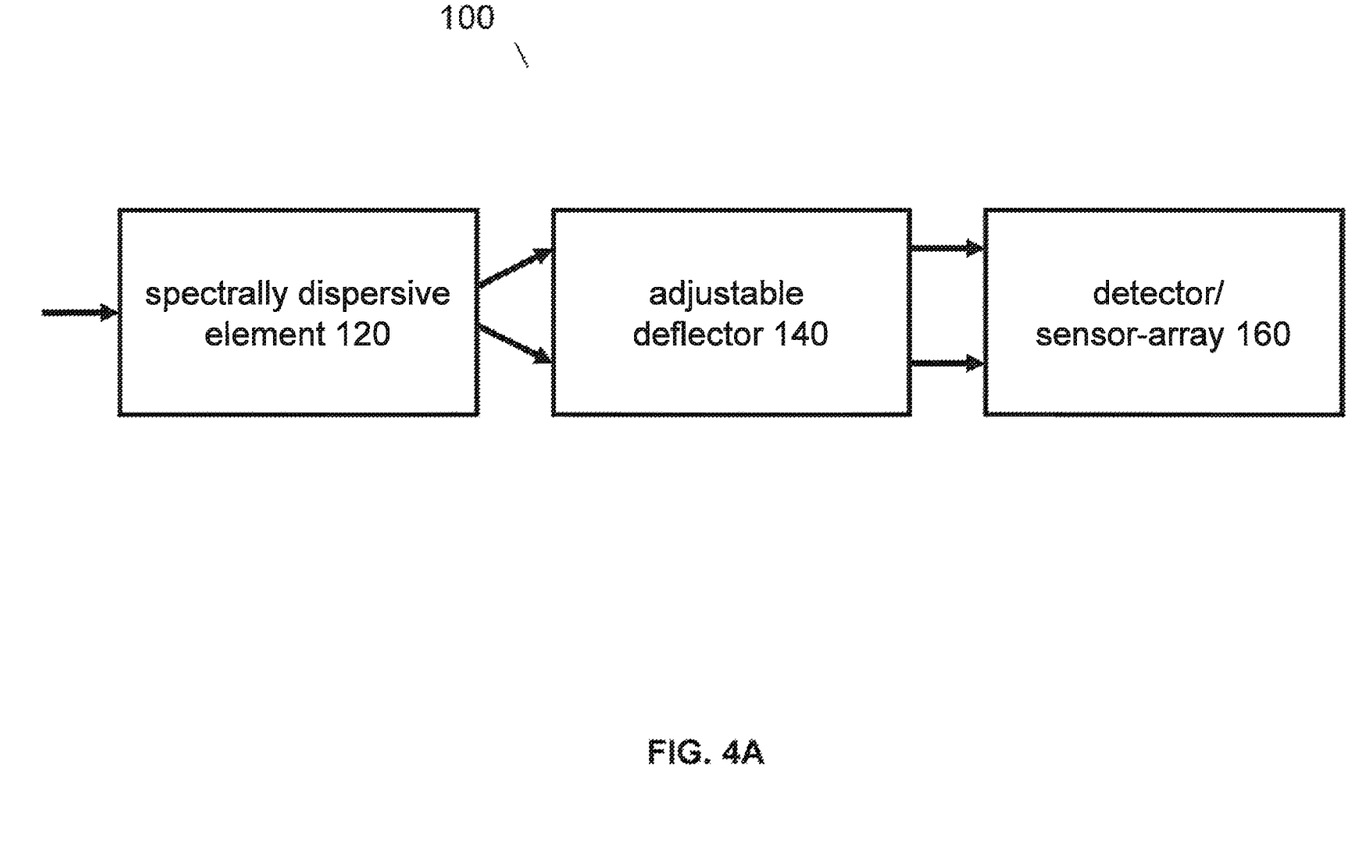
FIGS. 4A-B illustrate two embodiments of spectrometers with adjustable-deflector-controlled alignment.
Figure 4B:
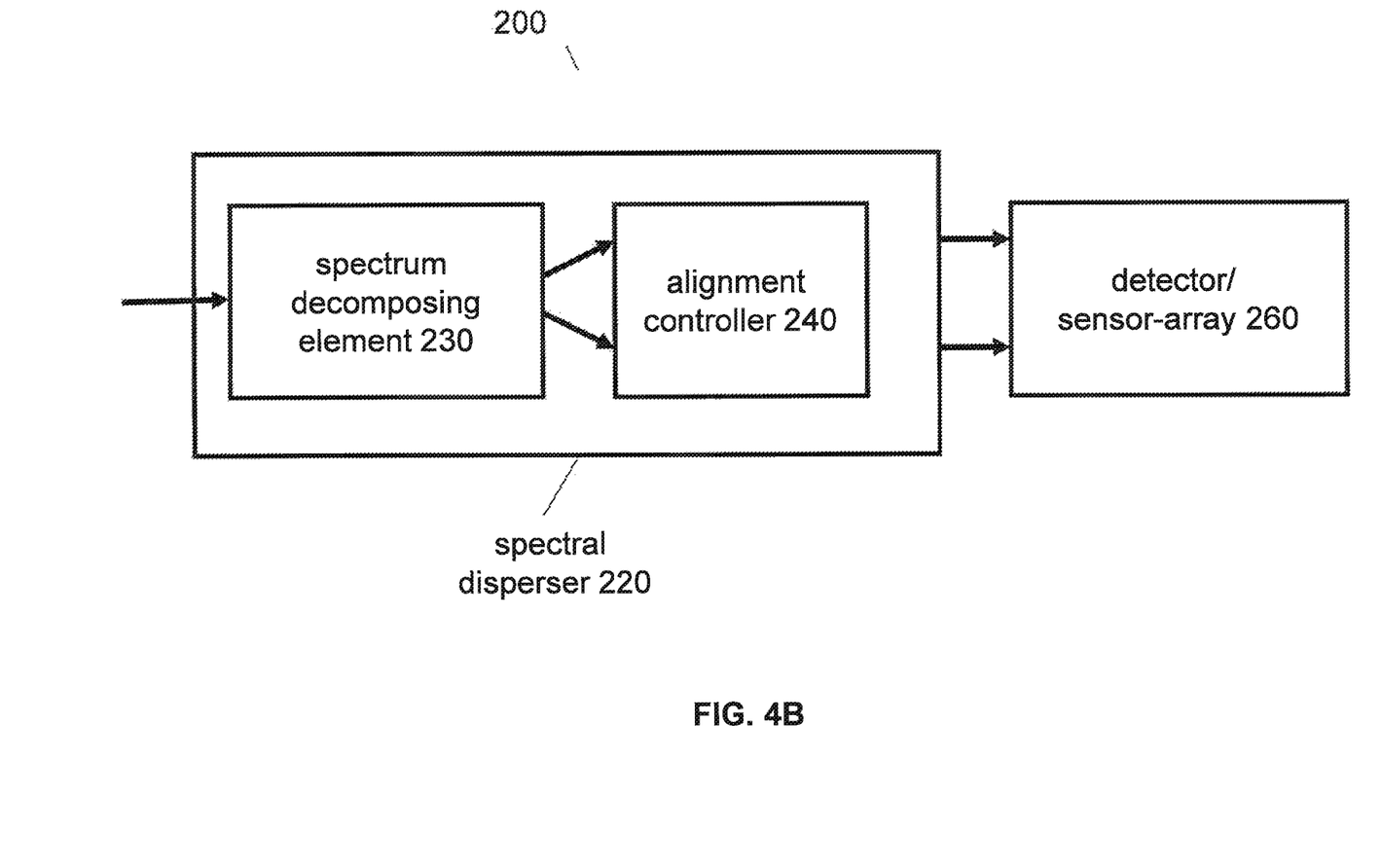

FIGS. 4A-B illustrate various embodiments of a spectrometer advantageously capable of providing improved alignment with a sensor array.

FIG. 4A illustrates an embodiment of a spectrometer 100 that includes a spectrally dispersive optical element 120, a leveraged-optics adjustable deflector 140 and a detector or sensor array 160.

The spectrally dispersive optical element 120 can be configured to receive a collimated image light and to spectrally disperse the received image light. The image light or interference beam can be received from a beam splitter of a Spectral Domain Optical Coherence Tomographic (SD-OCT) device, combined from a returned image beam and a reference beam.

While applications in conjunction with SD-OCT devices are described in more detail in this patent document, the spectrometers 100 can have a wide field of use in other optical systems as well. Also, the spectrometer can be either the imaging type or the non-imaging type.

The spectrally dispersive optical element 120 can include a prism, a grating, an optical element with a wavelength dependent index of refraction, an optical element with a wavelength dependent transmission property or an optical element with a wavelength dependent deflection property.

The detector or sensor array 160 can be configured to receive the spectrally dispersed and adjustably deflected light. The sensor array 160 can include pixels, Charge-Coupled Detectors (CCDs), or an array of any other type of sensors that generate an electric signal based on detected light. The detector 160 can also include a two-dimensional sensor array and a detector camera.

All optical elements of the spectrometer 100, including the sensor array 160, can be bonded or locked down in permanently non-movable stages. Such bonded designs ensure the good long term stability of the spectrometer and its performance. As discussed above though, in bonded-element spectrometers it can be a challenge to guide the spectrum S onto and align the spectrum S with the linear sensor array 160, since the mechanical variations of the mounts, of the bondings and of the locking/clamping procedures, introduced by the inaccuracies of the assembly process, can move the beam position at the detector in excess of the height or width of the pixels of the linear sensor array 160. As described above, in fact the beam may be moved or offset by several multiples of the pixel width, leading to substantial challenges for the assembly and calibration. The cumulative error and the resulting lateral misalignment Δ(lat), which accumulates from the variations of the individual optical elements can add up to hundreds of microns, whereas the width of the individual pixels is typically only 10 to 20 microns, again highlighting the challenges of the lateral alignment of the spectrometer 100.

FIG. 4A illustrates that in the spectrometer 100 this design challenge can be addressed by including the leveraged-optics adjustable deflector 140 that can be configured to adjustably deflect the spectrally dispersed light.

Aspects of the leveraged-optics adjustable deflector 140 include that (a) the mechanical adjustments are leveraged, and (b) the leveraging is optical instead of mechanical.

(a) In the present context leveraging can refer to the deflector 140 translating or down-stepping a mechanical adjustment into a much smaller adjustment of a deflection angle of the beam. For example, the turning of a mechanical adjuster screw on the mount of the deflector 140 by 360 degrees may be translated or down-stepped to a small mechanical movement of an intermediate mechanical stage, such as a few degree turn of a slow-turning platform via high gear-ratios or other means. This intermediate mechanical stage can then translate the down-stepped mechanical movement into a comparable optical movement e.g. by turning a mirror with the same few degrees to change the deflection angle of the deflected beam accordingly.

These systems leverage or down-step the adjustments mechanically, translating a larger mechanical movement of the adjuster stage into a smaller mechanical movement of the intermediate mechanical stage, and then translating the small mechanical movement of the intermediate mechanical stage into a comparably small optical adjustment.

However, mechanical down-stepping systems that use an intermediate mechanical stage can face the challenges of the long term stability, as the down-stepping screws, gears or lever arms may not resist drift and misalignment well and can be the source of a new or additional type of misalignments.

(b) The leveraged-optics adjustable deflector 140 of the spectrometer 100 is capable of translating large mechanical adjustments into small optical adjustments without using a down-stepping/leveraging intermediate mechanical stage. Avoiding the use of such an intermediate mechanical leveraging stage can preempt the problem of drift and misalignment, giving the spectrometer long term operational stability and robust alignment.

In some embodiments, the ratio of the angle of a mechanical adjustment to an optically caused change of the beam deflection angle can be 10 or more. In others, 100 or more, and in yet other embodiments 1,000 or more.

In some implementations, the long term stability can be optimized by confining the ratio of the mechanical adjustments to the optical adjustments not to exceed 1,000, in others 100 and in yet others, 10.

The leveraged-optics adjustable deflector 140 can include an optical element with an adjustable transmissive property and an optical element with an adjustable reflective property.

FIG. 4B illustrates another implementation of a spectrometer 200. The spectrometer 200 can include a spectral disperser 220 that includes a spectrum decomposing element 230 and a leveraged-optics alignment controller 240. The spectral disperser 220 can guide the dispersed spectrum onto a detector or sensor array 260. The spectrum decomposing element 230 can be analogous to the spectrally dispersive element 120, the alignment controller 240 can be analogous to the adjustable detector 140, and the detector/sensor-array 260 can be analogous to the sensor-array 160.

FIG. 4B illustrates that the spectrum decomposing element 230 and the alignment controller 240 together can form an integrated spectral disperser 220. For example, in some implementations, the alignment controller 240 can be implemented between optical elements of the spectral disperser 220.

Figure 5A:
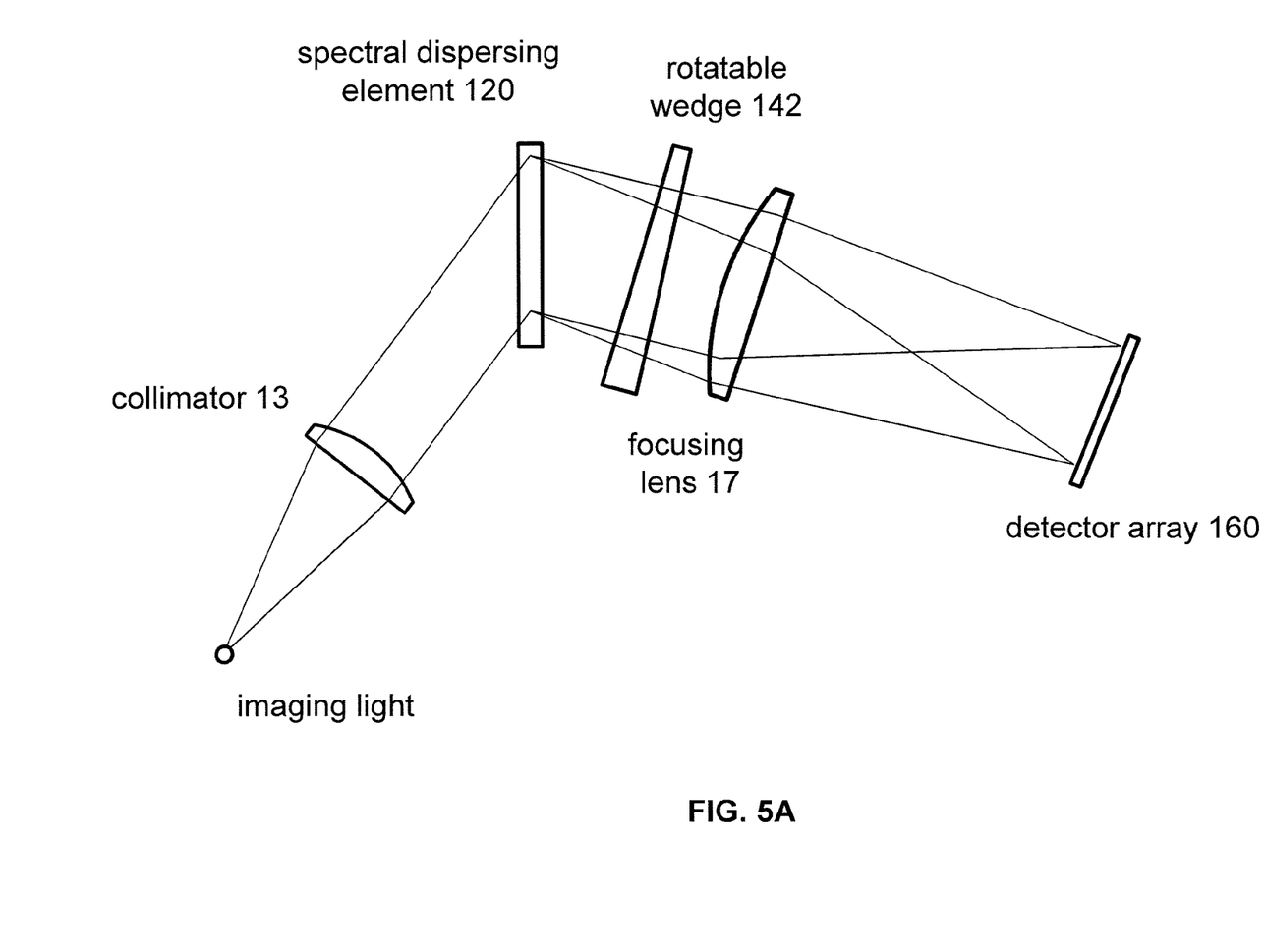
FIGS. 5A-B illustrate particular embodiments of a spectrometer with adjustable-deflector-controlled alignment.

FIG. 5A illustrates a specific embodiment of the spectrometers of FIGS. 4A-B. The spectrometer of FIG. 5A can be an imaging spectrometer, including the collimator 13, converting the image light into a collimated light, and the focusing lens 17, focusing and imaging the spectrally dispersed light onto the detector/sensor array 160.

The leveraged-optics adjustable deflector 140 in this implementation can include a rotatable wedge or prism 142. The rotatable wedge prism 142 can vary or adjust a location of the spectrum S relative to the linear sensor array 160 and compensate or control the lateral misalignment Δ(lat), generated by the tolerance error or variation of the installation of the optical elements or their changing operating conditions.

The rotatable wedge, or wedge prism with a small tilt/wedge angle is an example of a leveraging or down-stepping mechanism that does not use an intermediate down-stepping mechanical stage, but instead in converts a large mechanical adjustment directly to a small optical adjustment. For example, a large mechanical 360 degree rotation of the rotatable wedge prism 142 can deflect the transmitted beam by 1 degree or less depending on the wedge angle, without employing an intermediate mechanical down-leveraging stage.

Figure 5B:
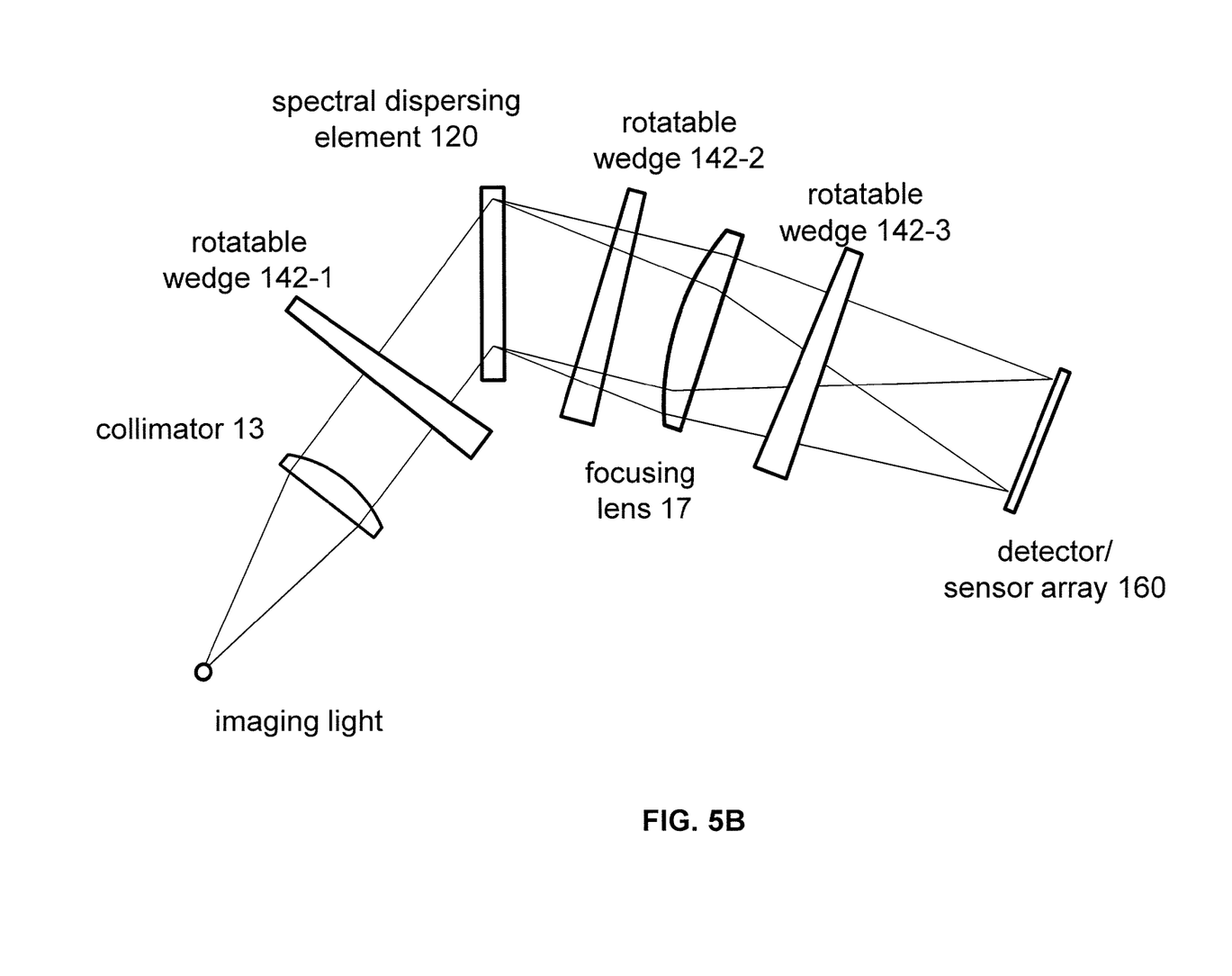

FIG. 5B illustrates that in some implementations the rotatable wedge or wedge prism can be inserted into various segments of the optical path, such as between the collimator 13 and the spectrally dispersing element 120 as a wedge 142-1; or between the spectrally dispersing element 120 and the focusing lens 17 as a wedge 142-2; or between the focusing lens 17 and the detector 160, as a wedge 142-3. In other implementations any two or even all three rotatable wedges 142-1, 142-2, and 142-3 can be inserted. These embodiments where the rotatable wedge is positioned between elements of the spectral disperser 220, can be viewed as implementations of the spectrometer 200 of FIG. 4B. The freedom of positioning the rotatable wedge 142 at different segments of the optical path allows an optimization of the design to satisfy the desired extent of the linear translation of the spectrum.

Figure 6:
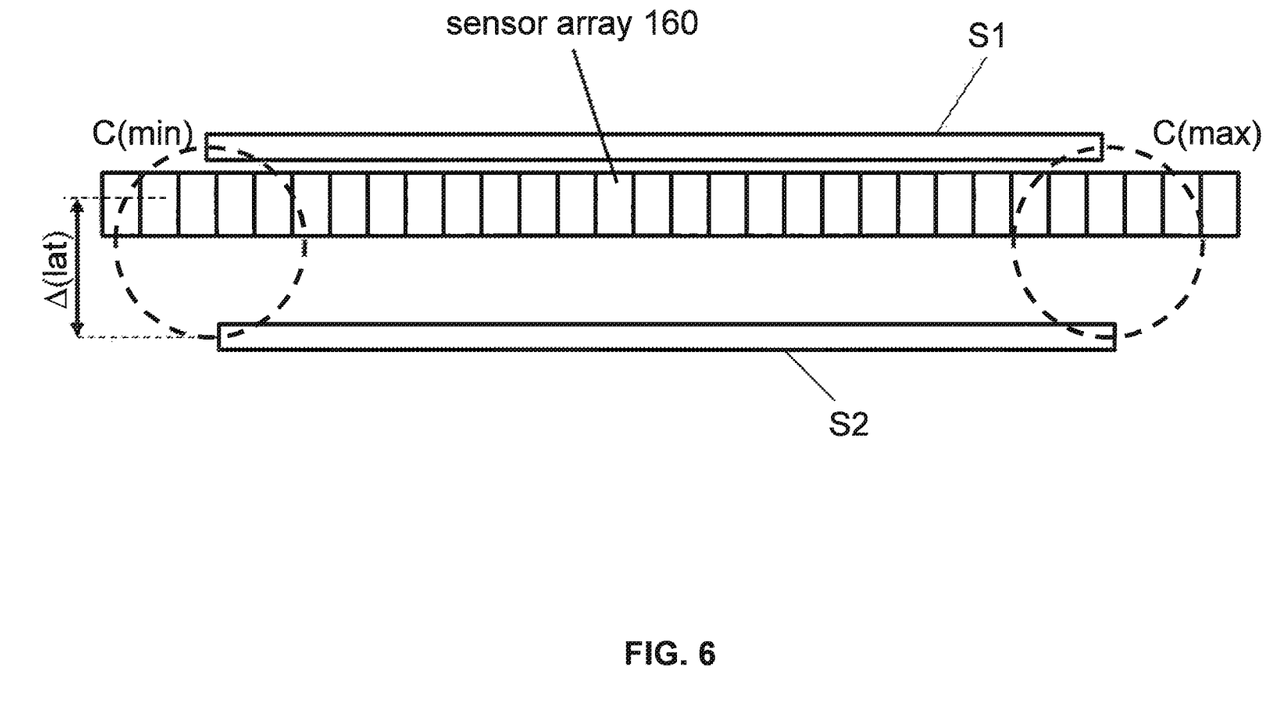
FIG. 6 illustrates the evolution of the laterally misaligned spectrum with the rotation of the rotating wedge.

FIG. 6 illustrates that a rotation of the wedge prism 142 can result in a circular motion of the laterally spread spectrum S. Analysis of the optics shows that the approximate endpoints of the spectrum S, corresponding to the minimum wavelength λ(min) and the maximum wavelength λ(max) move around circles labeled C(min) and C(max). The two external lateral positions of the spectra S1 and S2, and correspondingly the circles C(min) and C(max) can be asymmetric relative to the linear sensor array 160.

A first detector-beam-position range Δ(lat-deflector) denotes the maximum extent, or range, of the lateral misalignment, caused and controlled by the rotatable wedge prism 142 and in general by the adjustable controller 140 or 240. In some typical implementations, this first detector-beam-position range Δ(lat-deflector) can exceed a second detector-beam-position range Δ(lat-cumulative), a lateral range swept by the beam position in the plane of the detector 160 associated with a cumulative position-tolerance range of components of the spectrometer 100 or 200.

As discussed earlier, Δ(lat-cumulative) can have at least two origins. One of the origins can be the variation, or tolerance error, of the positions of the individual elements of the spectrometer arising during the assembly process that includes manual manipulations. Another origin can be the changing operating parameters, such as the operating temperature of the spectrometer, or mechanical deformations and wear and tear.

Visibly, by rotating the rotatable wedge 142 of FIG. 5A, or in general, by adjusting the adjustable deflector 140 of FIGS. 4A-B, it is possible to adjust the deflector 140 to compensate the cumulative misalignment caused by the variations or tolerance error of the assembly of the optical elements and translate the spectrum S back onto the linear sensor array 160, as long as $\Delta$(lat-deflector) is greater than $\Delta$(lat-cumulative).

In the same spirit, if $\Delta$(lat-deflector) is greater than $\Delta$(lat-operating), where $\Delta$(lat-operating) represents an operational detector-beam-position range, i.e. the range of lateral misalignments driven by changing operating parameters of the spectrometer 100-200, then an adjustment of the adjustable deflector 140 is capable of compensating the misalignments generated by these changing operating parameters. Examples of such changing operating parameters include changing operating temperatures, drifting position of optical elements due to regular wear-and-tear of the spectrometer associated with extensive use, and a change of the operating environment e.g. in the course of repositioning, moving or even reinstalling the spectrometer.

Another advantage of employing the optically leveraged adjustable deflector 140 is that the spectrometers 100-200 reliably stay aligned and in position on the long term because the optical alignment of the thin wedge prism 142 with a small wedge angle is not sensitive to either a translation or a tilt of the wedge 142. When the wedge prism 142 is placed into the beam path substantially perpendicularly to the optical beam propagation, only the rotation or angular alignment of the wedge 142 around the optical axis affects the position of the spectrum S relative to the linear sensor array 142. The parameters of the adjustable deflector 140 can be selected such that it provides angular alignment control with a range of 0.1 mrad. With such a design, the adjustable deflector 140 can guide the laterally spread spectrum S onto the linear sensor array 160, while at the same time even larger angular misalignments of the deflector 140 will not negatively impact the angular alignment as the angular alignment has a tolerance of the order of 1 mrad. Thus, mounting the wedge prism in a variable stage, such as a rotatable frame and clamping it once the lateral alignment is optimized, allows a precise adjustment of the spectrometer 100-200 while not undermining or sacrificing the long term stability of the spectrometer 100-200.

In some implementations of the spectrometers 100 and 200 the optical distortion of the design can also be minimized by applying implementing the wedge prism 142 with a small wedge angle and small thickness.

In some implementations of the spectrometers 100 and 200 an operational beam misalignment caused by the adjustable deflector 140 can be smaller than a misalignment tolerance of the detector 160.

In some implementations of the spectrometers 100 and 200 the adjustable deflector can be configured to compensate a lateral misalignment of the spectrally dispersed light without introducing an angular misalignment larger than an aspect ratio of the detector.

While this specification contains many specifics, these should not be construed as limitations on the scope of the invention or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The invention claimed is:

1. A spectrometer, comprising:
   a spectrally dispersive optical element configured to spectrally disperse a received light;
   a leveraged-optics adjustable deflector to adjustably deflect the spectrally dispersed light; and
   a detector array to receive the spectrally dispersed and adjustably deflected light, wherein
   the leveraged-optics adjustable deflector is configured to leverage an angle of a mechanical adjustment into an at least 10 times smaller angle of an optical adjustment.

2. The spectrometer of claim 1, wherein:
   the received light comprises an interference beam combined from a returned image beam and a reference beam.

3. The spectrometer of claim 1, the spectrally dispersive optical element comprising at least one of:
   a prism, a grating, an optical element with a wavelength dependent index of refraction, an optical element with a wavelength dependent transmission property and an optical element with a wavelength dependent deflection property.

4. The spectrometer of claim 1, the detector array comprising at least one of:
   a linear sensor array, a two-dimensional sensor array, and a detector camera.

5. The spectrometer of claim 1, the leveraged-optics adjustable deflector comprising:
   an optical element with at least one of an adjustable transmissive property and an adjustable reflective property.

6. The spectrometer of claim 1, wherein:
   a ratio of the angle of the mechanical adjustment to the angle of the optical adjustment exceeds 100.

7. The spectrometer of claim 1, wherein:
   a ratio of the angle of the mechanical adjustment to the angle of the optical adjustment is more than 5 and less than 100.

8. The spectrometer of claim 1, the adjustable deflector comprising:
   at least one rotatable wedged optical plate.

9. The spectrometer of claim 1, wherein:
   the spectrometer is an imaging spectrometer, comprising
   a collimator, converting the received light into a parallel light; and
   a focusing lens, focusing and imaging the spectrally dispersed light onto the detector array.

10. The spectrometer of claim 1, wherein:
    a first detector-beam-position range associated with a deflection-adjustment range of the deflector exceeds a second detector-beam-position range associated with a cumulative position-tolerance range of components of the spectrometer.

11. The spectrometer of claim 1, wherein:
    a first detector-beam-position range associated with a deflection-adjustment range of the deflector exceeds an operational detector-beam-position range of the spectrometer.

12. The spectrometer of claim 1, wherein:
    an operational beam misalignment caused by the leveraged-optics adjustable deflector is smaller than a misalignment tolerance of the detector.

13. The spectrometer of claim 1, wherein:
the adjustable deflector is configured to compensate a lateral misalignment of the spectrally dispersed light without introducing an angular misalignment larger than an aspect ratio of the detector.

14. The spectrometer of claim 1, wherein
the spectrometer is configured to allow compensation of a longitudinal misalignment through recalibration of its sensors using a known-wavelength light.

15. A spectral domain optical coherence tomography (SD-OCT) device, comprising:
- a spectral decomposer, configured
  - to receive an interfering light, and
  - to create a sheet of interfering light by laterally separating spectral components of the interfering light;
- a sensor array to detect different spectral components of the sheet of interfering light by different sensors; and
- a leveraged adjustable alignment-controller to control an alignment of the sheet of light with the sensor array, wherein
  - the leveraged adjustable alignment-controller is configured to leverage an angle of a mechanical adjustment into an at least 10 times smaller angle of an optical adjustment.

16. The SD-OCT device of claim 15, the alignment-controller comprising:
- a rotatable wedged prism.

17. A spectrometer, comprising:
- a spectral disperser to laterally disperse spectral components of an image light;
- a sensor array to sense the spectral components of the image light; and
- an optically leveraged alignment-controller
- capable of compensating a cumulative beam position misalignment due to the positional variation of elements of the spectrometer, wherein
  - the optically leveraged alignment-controller is configured to leverage an angle of a mechanical adjustment into an at least 10 times smaller angle of an optical adjustment.

\* \* \* \* \*